Oct. 18, 1927.

J. E. TWITCHELL 1,646,176

CLEANING DEVICE

Filed July 10, 1925

Inventor

J. E. Twitchell

By G. A. Lovett Attorney

Patented Oct. 18, 1927.

1,646,176

UNITED STATES PATENT OFFICE.

JAMES E. TWITCHELL, OF DETROIT, MICHIGAN.

CLEANING DEVICE.

Application filed July 10, 1925. Serial No. 42,806.

The invention relates to cleaning devices and more especially to attachments adapted to be associated with a water supply conduit such, for example, as a hose or nozzle, and to be utilized in washing articles such as are ordinarily washed by the application of water and the use of sponges, brushes or the like. While the device is of general application for washing or cleaning it is of especial utility for washing automobiles in which operation it is customary to flow water upon the surfaces to be cleaned and simultaneously rub the surfaces with a rag or sponge to remove mud or grease.

The invention, in the embodiment described, comprises, in brief, a clamping device adapted for attachment to the extremity of a hose or like water supply conduit or to a hose nozzle, and holding devices adapted to be secured to said clamping device so as to be readily removable therefrom, as by resilient connections, and arranged to support cleaning or rubbing means such as a sponge or brush.

In the accompanying drawings illustrating one embodiment of the invention, Fig. 1 is a plan view, partly broken away, showing a sponge held in operative relation to a hose nozzle.

Figure 1:
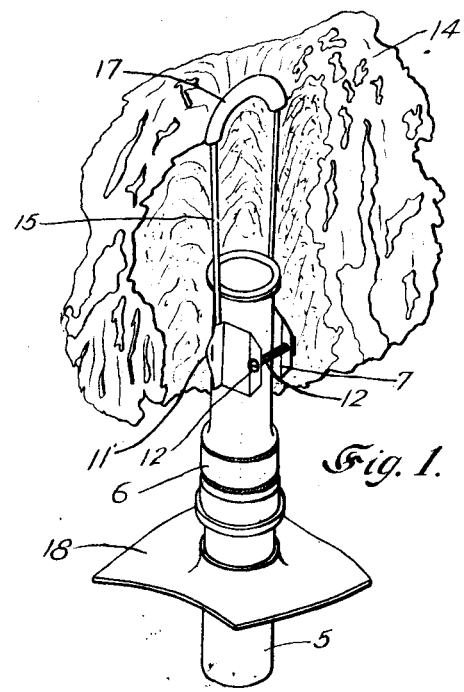

Referring to the drawings, 5 indicates a water supply conduit which may be of the character of an ordinary garden hose. 6 indicates a hose nozzle which may also be of any usual or suitable character adapted to supply water or other cleaning liquid, preferably at low pressure.

The clamping device employed and indicated at 7 is of substantially U-form. It is made preferably of sheet metal and comprises approximately parallel wings 8, 8', and a connecting curved portion 9. At the junction of this curved portion and the wings the clamp is formed with ribs 10, 10', extending outwardly so as to provide internal grooves lengthwise of the clamp. The central portion of each rib is shaped to provide a seat for a correspondingly shaped part on the holding devices employed in connection with the clamp. This seat may be constituted by the hollow interior of an outwardly projecting portion 11, 11', at the center of the rib or by any other formation adapted to retain the holding devices in operative relation to the clamp. The wings 8, 8', are apertured to permit passage therethrough of a screw or bolt 12 having thereon a nut 13 by which the clamp may be contracted and thereby secured to the shank of the hose nozzle 6, as shown in Fig. 1, or adjacent to the open end of the hose if the latter is not provided with a nozzle.

A body of rubbing material, such as the sponge 14, is secured to the clamp in position to receive the water or cleaning liquid delivered from the end of the nozzle or hose. The securing means comprises a holder 15 which may be formed of a piece of heavy spring wire bent to approximately U-shape. The ends are preferably sharpened so that they may be inserted through the body of the sponge or other material employed for rubbing. Adjacent to the ends the holder is formed to fit the seats 11, 11', of the clamp 7, as by bending the wire outwardly as indicated at 16, 16'. The closed end of the U may be covered with protecting means, such as a piece of rubber tubing 17, so that the metal will not engage the surface that is being cleaned.

In the use of this device the pointed ends of the holder may be forced through the sponge, or the like, and then, by slightly compressing the holder, the ends may be inserted into the clamp and the gripping or retaining means 16, 16', positioned in engagement with the seats 11, 11', the resilience of the holder assisting in retaining the parts in engagement. The clamp is then secured to the hose or nozzle in such position that the water discharged from the latter will flow through or over the sponge. The user may then proceed with the washing operation, the supply of water being adjusted as desired. The clean water will thus be supplied directly to the parts being rubbed, thus serving to remove dirt from the surfaces and also from the rubbing material. A shield 18 may be provided to protect the hand of the user, which shield may comprise a piece of sheet rubber of suitable rigidity with a central aperture of slightly less diameter than the hose so that the shield may be positioned upon the hose or nozzle in the rear of the washing device and be retained in such position by its inherent resilience.

Figure 4:
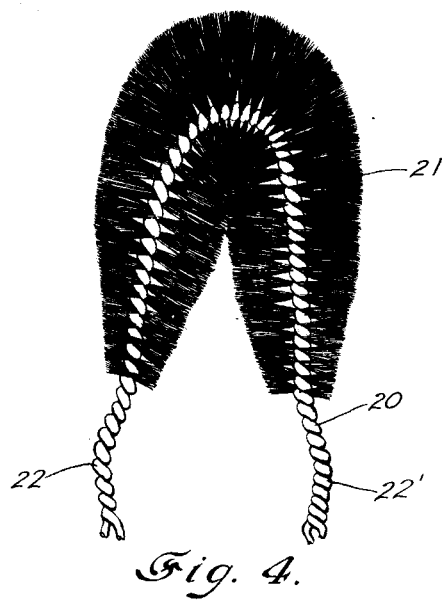
Figure 3:
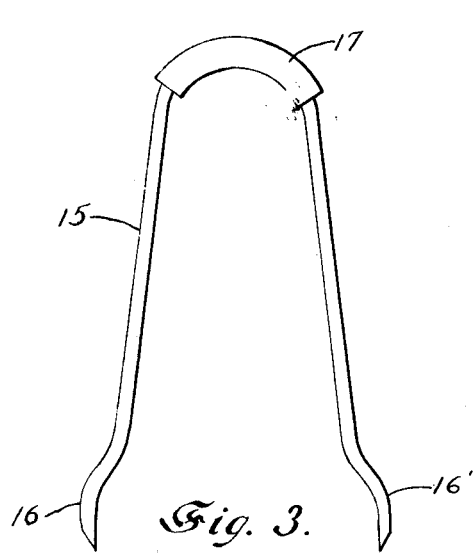
Fig. 3 is a detailed view of a holding device adapted to engage a sponge or the like, and Fig. 4 is a view of a second holding device adapted to position a brush in proper relation to the clamping device.
Figure 2:
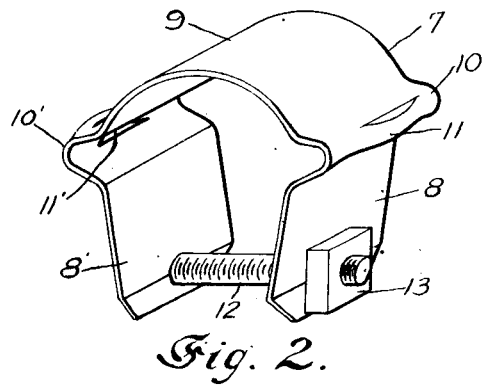
Fig. 2 is a detail view of a clamping device.

A second form of holder and rubbing means are shown in Fig. 4. The holder 20 in this instance comprises a plurality of strands of wire twisted together and holding between the strands the bristles 21, thus forming a brush of a well-known type. The wire is bent to approximately a U shape, similarly to the holder 15, and the two ends are formed, as at 22, 22', to provide engaging or retaining means adapted to cooperate with seats in the clamp, for example, the seats 11, 11'.

The use of this form of holder and rubbing means is similar to that already described, the clamp and brush being so positioned with reference to the hose or nozzle that the water will flow through the brush. This form of device is of especial utility in cleaning parts, such as automobile wheels, fenders, etc., where a stiffer body of rubbing material is required than for the upper parts of the automobile body.

While I have disclosed herein specific embodiments of the invention it will be understood that variations may be made by one skilled in the art and therefore I do not wish to be limited to the specific details described except as required by the language of the appended claims in view of the prior art.

I claim:

1. A clamp for supporting rubbing material upon a hose or nozzle comprising a plate of sheet metal bent to approximately U form and having outwardly extending ribs upon opposite sides thereof, said ribs being formed to provide retaining means whereby a holder for said rubbing material may be detachably supported, and means for contracting said clamp upon a hose or nozzle.

2. Means for supporting rubbing material in operative relation to the discharge opening of a hose or nozzle comprising a U shaped clamp formed of sheet metal having longitudinal internal grooves or channels upon opposite sides thereof, with depressions intermediate the ends of the grooves to provide seats, and a holder for rubbing material comprising a resilient loop having its ends shaped to conform to said grooves and seats and adapted to be held therein by the expansive tendency of said loop.

3. The combination with a water supply conduit of a support mounted thereon provided with seats, a body of rubbing material, and means for retaining said body in position to receive water from said conduit comprising a holder engaging said body and having spring portions fitting in said seats, said seats having sufficient opening to permit free removal therefrom of said spring portions by bending movement of the latter, said spring portions being formed and tensioned to force themselves into resilient engagement with said seats and constituting the sole retaining means whereby said holder is maintained detachably in position on said support.

4. The combination with a support adapted to be fixed to a water supply conduit, said support having seats opening inwardly, a body of rubbing material and a holder for said material comprising a substantially U-shaped loop of spring wire provided with outwardly extending projections adjacent to its extremities engaged in said seats, said seats shaped to permit removal of said projections therefrom by movement of said extremities toward each other, said loop being formed with greater distance between its ends than the distance between said seats to force said projections resiliently into said seats and thereby retain said holder on said support.

5. The combination with a sponge of a holder therefor comprising a substantially U-shaped loop of spring wire having its ends sharpened and the arms of the loop inserted through said sponge, and means for securing said holder upon a water supply conduit in such position as to supply water to said sponge.

6. Structure as set forth in claim 5, said loop having a covering of non-abrasive material over the exposed portion of the loop.

In testimony whereof I affix my signature.

JAMES E. TWITCHELL.